Patented Feb. 19, 1929.

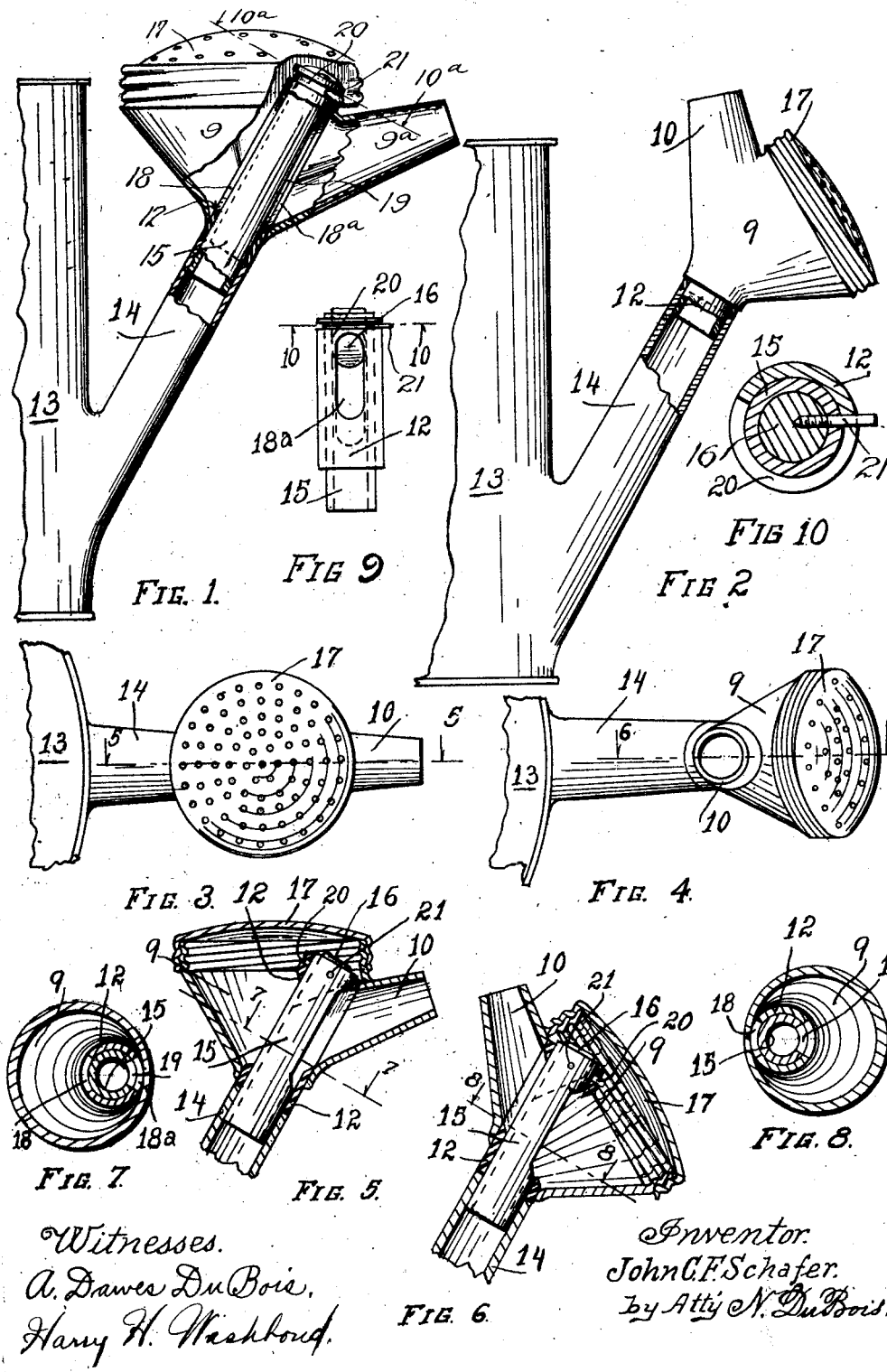

1,702,523

UNITED STATES PATENT OFFICE.

JOHN C. F. SCHAFER, OF MOUNT PULASKI, ILLINOIS.

COMBINATION SPOUT AND SPRINKLER HEAD FOR WATERING POTS.

Application filed July 26, 1924. Serial No. 728,472.

The purposes of the invention are: to provide a simple and effective combination spout and sprinkler-head which may be readily attached to and used on the main spout of watering pots already in use; may be manufactured at a relatively low cost and sold at a reasonable price.

The invention is illustrated in the accompanying drawing to which reference is hereby made.

Figure 1 is a side elevation of a combined spout and sprinkler-head attached in the end of the main spout of a watering pot of usual construction. In this view the combined spout and sprinkler-head is shown in position for pouring; Fig. 2 is a similar elevation of the same combined spout and sprinkler-head in position in the main spout of the same watering pot, showing the sprinkler-head in position for sprinkling; Fig. 3 is a top plan of the appliance showing the same parts that are shown in Fig. 1; Fig. 4 is a top plan, showing the same parts that are shown in Fig. 2; Fig. 5 is a vertical section taken on the line 5—5 of Fig. 3; Fig. 6 is a vertical section taken on the line 6—6 of Fig. 4; Fig. 7 is a transverse section taken on the line 7—7 of Fig. 5; Fig. 8 is a transverse section taken on the line 8—8 of Fig. 6; Fig. 9 is a side elevation of the detached outer tube, showing the inner tube in place in the outer tube; and Fig. 10 is an enlarged transverse section taken on the line 10—10 of Fig. 9. The same reference numerals designate the same parts in all the views.

The appliance will preferably be made of suitable sheet metal. The appliance comprises a hollow sprinkler body 9; a pouring spout 9ª integral with the body; a central inclined tube 12 permanently attached to the members 9 and 9ª and an inlet tube 15 fitting snugly in the upper end of the main spout 14 of a watering pot 13 of usual construction. The tube 15 is immovable under ordinary conditions of use and the tube 12 is rotative around the tube 15. The upper end of the tube 15 is closed by a fixed plug 16. The tube 12 has an opening 18 through which water is admitted into the body 9; and an opening 18ª through which water is admitted to the pouring spout 9ª. The tube 15 has an opening 19 with which the opening 18 or the opening 18ª registers according to the rotation of the tube 12 relative to the tube 15.

The removable perforated cap or rose member 17 screws onto the upper end of the body 9. The cap is readily removable for access to the interior of the body for the purpose of cleaning or repairing the appliance.

An arcuate slot 20 near the upper end of the tube 12 extends half way around the tube and a accommodates a pin 21 fixed on the inner tube 15 and the pin prevents excessive rotation of the tube 12 in either direction.

The tube 15 is held by friction against turning in the spout 14 under ordinary conditions of use. The tube 12 is fixed in the head and has a semi-circular slot 20 accommodating a pin 21 secured on the relatively stationary tube 15. Upon rotation of the head in one direction one end wall of the slot will stop against the relatively stationary pin when the head is in position for pouring; and reversely, when the head is rotated in the opposite direction the opposite end wall of the same slot will stop against the same pin when the head is in position for sprinkling.

If it be desired to pour water through the pouring spout 9ª, the body 9 will be turned by hand to the position shown in Fig. 1; and if it be desired to sprinkle water through the cap or rose 17, the body will be turned to the position shown in Fig. 2.

It will be noted that the common axis of the tubes 12 and 15 is in line with the axis of the main spout 14, hence if the body 9 be rotated part way around in one direction, the perforated cap 17 will be uppermost; and the discharge of water will be outward through the spout 10; and if the body be rotated oppositely part way around, the spout 10 will be uppermost and the discharge of water will be through the perforations of the cap 17.

I am aware of the prior use of adjustable spraying heads or sprinkler heads in conjunction with the main spout of watering pots, or the like. I am also aware of the common use of slot and pin devices to limit the travel of one element relative to another. I therefore do not claim those devices broadly, apart from the other elements of my improved mechanism.

Having fully described my invention what I claim as new and desire to secure by Letters Patent is:

In conjunction with the main spout of a watering pot, an inner tube fitting snugly in the free end of said main spout and having an elongated opening; an outer tube rotative right and left, around said inner tube and having opposite outlet openings respectively registrable with said elongated opening in said inner tube, and also having an arcuate slot; a plug closing the upper end of said inner tube; a laterally projecting pin adapted to traverse said arcuate slot and strike against its respective end walls at the instant that either one of the openings in said outer tube registers with said elongated opening in said inner tube, said pin extending also through the circular wall of said inner tube and securing said plug therein; a hollow body secured on said outer tube and having a perforated cap coming into position to spray water, upon limited rotation of said hollow body in one direction, and an outlet spout integral with said hollow body coming into position to pour water upon limited rotation of said hollow body in the opposite direction.

In witness whereof I have hereunto signed my name at Mount Pulaski, Illinois, this 21st day of July, 1924.

JOHN C. F. SCHAFER.